United States Patent
Yamagishi

(10) Patent No.: US 6,220,082 B1
(45) Date of Patent: Apr. 24, 2001

(54) LEAKAGE CHECK SYSTEM FOR LIQUID ENCLOSED IN VESSEL

(75) Inventor: Tetsuo Yamagishi, Tokyo (JP)

(73) Assignees: Sapporo Breweries Ltd.; Toa Manufacturing Corporation, both of Tokyo (JP)

( * ) Notice: Subject to any disclaimer, the term of this patent is extended or adjusted under 35 U.S.C. 154(b) by 0 days.

(21) Appl. No.: 09/197,208

(22) Filed: Nov. 20, 1998

(30) Foreign Application Priority Data

Nov. 28, 1997 (JP) ..................................... 9-329052

(51) Int. Cl.⁷ .............................. G01M 3/16; G01M 3/18
(52) U.S. Cl. ................... 73/49.3; 73/41; 73/45; 73/45.4; 73/49.2; 73/49.8
(58) Field of Search ................... 73/40, 41, 45, 73/45.1, 45.4, 49.2, 49.3, 49.8, 52

(56) References Cited

U.S. PATENT DOCUMENTS

| 4,047,424 | 9/1977 | Rollason et al. ........................ 73/52 |
| 5,535,618 | 7/1996 | Konieczka ............................. 73/49.3 |

FOREIGN PATENT DOCUMENTS

| 3439073 | * | 5/1986 | (DE) ...................................... 73/49.3 |
| 3-180733 | | 8/1991 | (JP) ...................................... 73/49.2 |
| 441632 | | 8/1991 | (EP) ...................................... 73/49.2 |
| 3-269232 | | 11/1991 | (JP) ...................................... 73/49.2 |
| 1341509 | | 8/1987 | (RU) ........................................ 73/40 |

OTHER PUBLICATIONS

Patent Abstracts of Japan, vol. 1995, No. 05, Jun. 30, 1995, JP 07 035638, Feb. 7, 1995.

* cited by examiner

Primary Examiner—Daniel S. Larkin
(74) Attorney, Agent, or Firm—Oblon, Spivak, McClelland, Maier & Neustadt, P.C.

(57) ABSTRACT

The leakage check system is applied to a vessel having a sealing valve unit that can close a gas passage and a liquid passage of the outlet port of the vessel. To determine the presence of a liquid leakage from the outlet port, there is provided an electrode for measuring liquid electrical conductivity. An actuator moves the electrode forward and backward relative to the outlet port. A forward part of the electrode is surrounded by a liquid receiver cup which is opposed to the outlet port during the leakage check of the liquid in the vessel. The forward part of the electrode is extended from a bottom of the liquid receiving cup. The liquid receiving cup is supplied with a dilution water from a water feeder. The vessel is conveyed by a conveyor with the vessel being upside down so that the outlet port is directed downwardly. The outlet port of the vessel is insertable into the liquid receiving cup.

14 Claims, 12 Drawing Sheets

F I G. 6
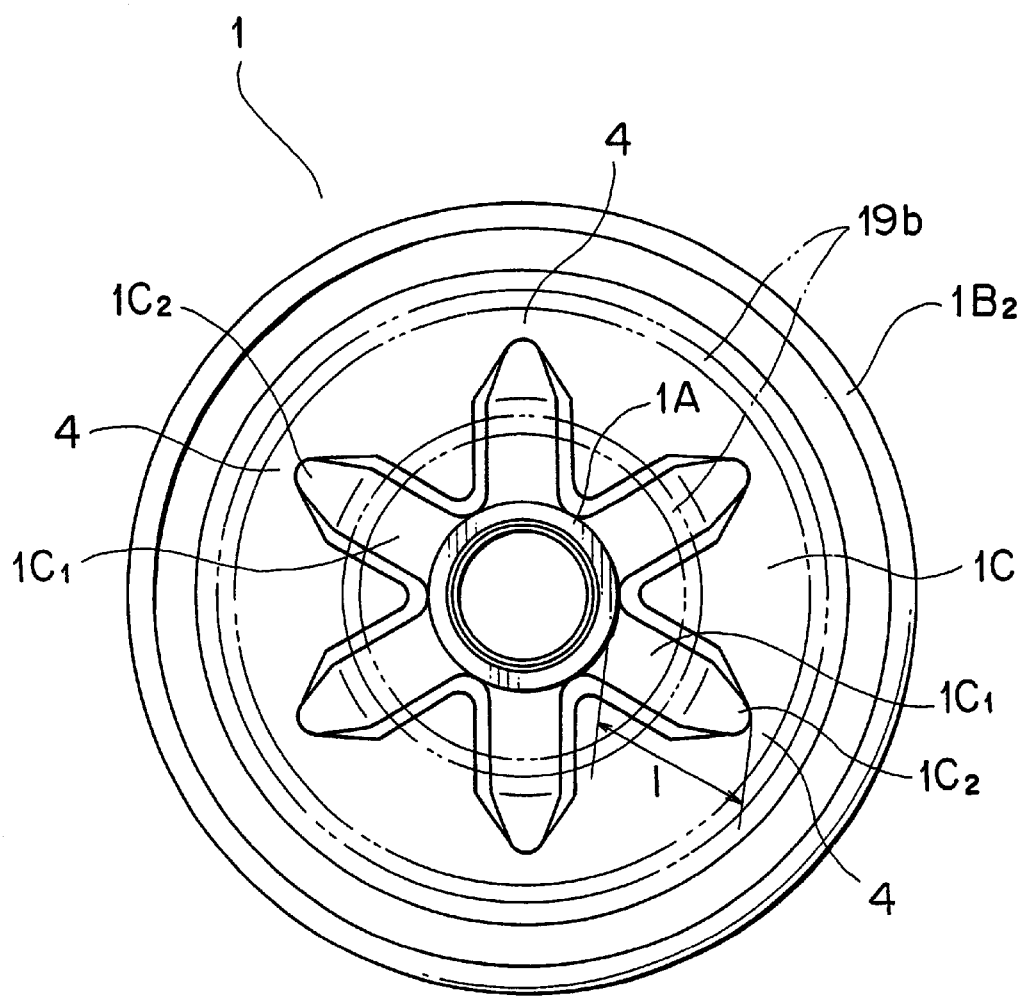

LEAKAGE CHECK SYSTEM FOR LIQUID ENCLOSED IN VESSEL

BACKGROUND OF THE INVENTION

1. Field of the Invention

The present invention relates to a leakage check system for an enclosed liquid, like beer, sealed in a vessel, which, for example, can determine whether the enclosed liquid has leaked from a port of the vessel to remove such unacceptable vessels.

2. Prior Art

There has been a barrel-shaped vessel made of aluminum plates or steel plates for containing a liquid, like beer. The vessel has a comparatively large capacity and has a durable structure. The vessel has a capacity of 7, 10, 15, 20, 25, or 50 liters.

The vessel has a sealing valve unit for preventing a liquid enclosed in the vessel from deteriorating in its quality and taste. The valve unit has a generally cylindrical outlet port that can seal the liquid even after a cap of the outlet port is removed.

The sealing valve unit, for example, as shown in FIG. 9, includes a generally cylindrical outlet port 1'A mounted in an upper end plate of a vessel 1' that contains a sealed-in liquid N, like beer, a bush screwed into an inner threaded surface of the outlet port 1'A of the vessel 1' to be attached to the outlet port 1'A, a cylindrical member c inserted in the bush a and pre-loaded by a first spring b, a gas sealing valve d engageable with an upper inner surface of the bush a and provided on an upper, outer circumferential surface of the cylindrical member c, and a liquid valve f provided inside an upper part of the cylindrical member c and pre-loaded by a second spring e. Opening the gas sealing valve d feeds a pressurized gas G into the vessel 1', which pumps the enclosed liquid N through the cylindrical member c to deliver the liquid N outside of the vessel 1'. That is, the sealing valve unit 5' has two valves consisting of the gas sealing valve d and the liquid valve f.

In FIG. 12, there is disclosed another known sealing valve unit 5" having a bush a. The bush a has an outer circumferential threaded surface that is screwed in an inner circumferential threaded surface 1'Al of an outlet port 1'A of a vessel 1'. In the bush a, there is provided a valve V' having a flat surface F' pre-loaded by a spring b' for closing a gas passage s1 and a liquid passage s2.

In a beer production line, there has been a leakage check system for determining whether an enclosed liquid sealed within a vessel is leaking from its outlet port. Recently, a leaked vessel found by the check system is removed from the production line, and the enclosed liquid in the vessel is drawn out to be cost-effectively reused. The empty vessel tends to be recycled in view of a resources problem.

A known leakage check system is shown in FIGS. 10 and 11. A barrel-shaped vessel 1' is provided with a generally cylindrical outlet port 1'A with a sealing valve unit 5' at an upper portion thereof. The vessel 1' in an upright position (the outlet port 1'A is directed upward) is conveyed by a conveyor 2'. The system includes a well g defined in the outlet port 1'A, a water feeder 27' for supplying a predetermined quantity of a dilution water into the well g, an electrode 17' that is soaked in a dilution liquid W in the wall g for measuring the electrical conductivity of the liquid W, a mounting plate 22' for vertically downwardly supporting the electrode 17', and an actuator 20' such as a hydraulic cylinder device for moving up and down the mounting plate 22' connected thereto.

In a test for checking whether the enclosed liquid N in the vessel 1' has leaked from the outlet port 1'A to the outside, first, the vessel 1' that has been conveyed by the conveyor 2' stops at a water supply location Q' where a predetermined quantity of a dilution water W required for the leakage check is supplied from the water feeder 27' into the well g defined in the outlet port 1'A. Next, the vessel 1' having the outlet port 1'A, the well g of which has been filled with the dilution liquid W, is moved forward by the conveyor 2' and is stopped at a leakage check location K'. Then, the actuator 20' moves the electrode 17' in its axial direction T to soak the electrode 17' in the dilution liquid W. Thus, the measurement of the electrical conductivity of the dilution liquid W can recognize the presence of leakage of the enclosed liquid N. The leakage of the enclosed liquid N occurs due to an incomplete closing or a deterioration of the gas sealing valve d or the liquid valve f of the sealing valve unit 5'.

However, in the known leakage check system of the enclosed liquid shown in FIGS. 10 and 11, the vessel 1' necessarily has the well g that is defined in the outlet port 1'A for storing the predetermined quantity of the dilution liquid W so as to measure the electrical conductivity. Furthermore, in the leakage check system, the electrode 17', the actuator 20' for moving the electrode 17', and the water feeder 27' should be arranged above the vessel 1' since the vessel 1' is conveyed by the conveyor 2' in the upright position so that the outlet port 1'A is directed upward.

In the case of the vessel 1' shown in FIG. 12, there is not a well in the outlet port 1'A for storing a dilution liquid since the outlet port 1'A has the valve V' provided with the flat surface F' that is located at the top of the outlet port 1'A. This arrangement is different from the outlet port shown in FIG. 9, which can have the wall g above the sealing valve unit 5'.

Moreover, in the known leakage check system, a travel distance L' of the vessel 1' between the water supply location Q' and the leakage check location K' is comparatively long so that it disadvantageously requires an additional transfer operation of the vessel 1' for checking the leakage of the enclosed liquid N in the vessel 1'. Furthermore, the transfer operation of the vessel 1' on the conveyor 2' exerts on the vessel 1' a vibration force or an impactive force due to, for example, friction between the vessel 1' and a guide G1 provided on each side of the moving conveyor 2'. Thereby, the dilution liquid W contained in the outlet port 1'A possibly flows out to the outside, partially losing the predetermined quantity of the dilution liquid W for the leakage check. In addition, the dilution liquid W might be contaminated with dust or other undesirable substances, which does not allow a correct leakage check.

Moreover, the known leakage check system uses the dilution liquid W that is stored in the well g defined in the outlet port 1'A for checking the leakage of the enclosed liquid N. Where the vessel 1' has the sealing valve unit 5' that includes the gas sealing valve d and the liquid valve f in the outlet port 1'A, only the leakage of the enclosed liquid N through the gas sealing valve d and the liquid valve f can be checked. Thus, the leakage of the enclosed liquid N from an engagement surface of the sealing valve unit 5' with the outlet port 1'A can not be checked by the known leakage check system.

Meanwhile, when the vessel 1' in an upside-down position is conveyed by the conveyor 2', the well g of the outlet port 1'A can not store a dilution liquid W. Thus, the above-described leakage check system would not be able to check the leakage at all. In addition, the leakage check system also would not be able to check the leakage of the enclosed liquid N from the sealing valve unit 5" shown in FIG. 12, which has the flat surface F at the top thereof, even when the vessel 1' is in an upside-down position.

In view of the above-mentioned disadvantages, a basic object of the present invention is to provide a leakage check system for an enclosed liquid in a vessel, which can check the vessel that is in an upside-down position so that an outlet port of the vessel is directed downward when conveyed by a conveyor. Furthermore, the leakage check system would be able to check the leakage of the enclosed liquid even when the vessel does not have a well in the outlet port but has a flat surface in the outlet port. In addition, the system would be able to keep a predetermined quantity of a dilution liquid for checking the leakage correctly and effectively with reduced check time.

SUMMARY OF THE INVENTION

According to a first basic configuration of the present invention, a leakage check system for a liquid enclosed in a vessel that has an outlet port having a sealing valve unit that can close a gas passage and a liquid passage, the leakage check system comprising:

an electrode for measuring liquid electrical conductivity to determine leakage of the enclosed liquid from the outlet port, an actuator for moving the electrode forward and backward relative to the outlet port in a longitudinal direction of the electrode, a liquid receiving cup surrounding a forward part of the electrode, the forward part of the electrode being extended from a bottom of the liquid receiving cup, and a water feeder for supplying a dilution water into the liquid receiving cup, wherein the vessel can be conveyed by a conveyor with the vessel being upside down so that the outlet port is directed downwardly, the outlet port of the vessel being insertable into the liquid receiving cup.

According to a second configuration of the present invention, the sealing valve unit includes:

a bush screwed in an inner threaded surface of the outlet port of the vessel, a cylindrical member inserted into the bush and pre-loaded by a first spring, a gas sealing valve engageable with an end surface of the bush and extending outwardly from a peripheral face of the cylindrical member, and a liquid valve closed by a pre-loaded second spring and positioned in an upper part of the cylindrical member for flowing out the enclosed liquid from the vessel through the cylindrical member by opening the gas sealing valve to feed a pressurized gas into the vessel.

According to a third configuration of the present invention, the sealing valve unit has a generally flat outer face and comprises:

a bush screwed in an inner threaded surface of the outlet port of the vessel, and a valve pre-loaded by a spring and positioned in the bush for closing the liquid passage and the gas passage that is positioned outside of the liquid passage.

According to a fourth configuration of the present invention, the vessel that is conveyed by the conveyor in an upside-down position can be moved on and removed from the conveyor by a lift provided near the conveyor at a leakage check location for the vessel, and the liquid receiving cup having a leading end of the electrode can move through an opening provided in the lift toward the outlet port of the vessel in a longitudinal direction of the electrode.

According to a fifth configuration of the present invention, the vessel has a pair of generally cylindrical peripheral walls one of which is extending upwardly and the other downwardly from the vessel, the extending peripheral will each having an upper end ring or a lower end ring, the outlet port being located within one of the extending peripheral walls.

According to a sixth configuration of the present invention, the vessel has an outwardly generally convex curved end wall and a generally cylindrical peripheral rising wall, the outlet port being located in the center of the end wall.

According to a seventh configuration of the present invention, the vessel has an end wall and the outlet port is located in the center of the end wall, the end wall having a plurality of ribs radially extending from the outlet port.

According to an eighth configuration of the present invention, the liquid receiving cup has a generally cylindrical side wall that can encircle the outlet port of the vessel with a space therebetween.

According to a ninth configuration of the present invention, the liquid receiving cup has a diameter that intersects with the radially extending ribs.

According to a tenth configuration of the present invention, the liquid receiving cup has a diameter that can encircle the radially extending ribs.

According to an eleventh configuration of the present invention, the system has an openable cover provided at a leakage check location, the cover being generally horizontally moved between the vessel and the liquid receiving cup so that the cover can close to protect the electrode after a leakage check of the enclosed liquid.

According to a twelfth configuration of the present invention, the check system further comprises a rotary actuator for vertically pivoting the liquid receiving cup to discharge the dilution water in the liquid receiving cup after every leakage check of the enclosed liquid.

According to a thirteenth configuration of the present invention, the check system further comprises at least one water jet nozzle for cleaning the liquid receiving cup and the electrode.

According to a fourteenth configuration of the present invention, the check system further comprises an air supplier having an air blow nozzle for feeding a hot air or a dry air to dry the liquid receiving cup and the electrode after the dilution water in the liquid receiving cup is discharged.

BRIEF DESCRIPTION OF THE DRAWINGS

FIG. 6 is an enlarged plan view showing the vessel of FIG. 5;

DETAILED DESCRIPTION OF THE PREFERRED EMBODIMENTS

Referring to FIGS. 1 to 8, embodiments of the present invention will be discussed.

Figure 1:
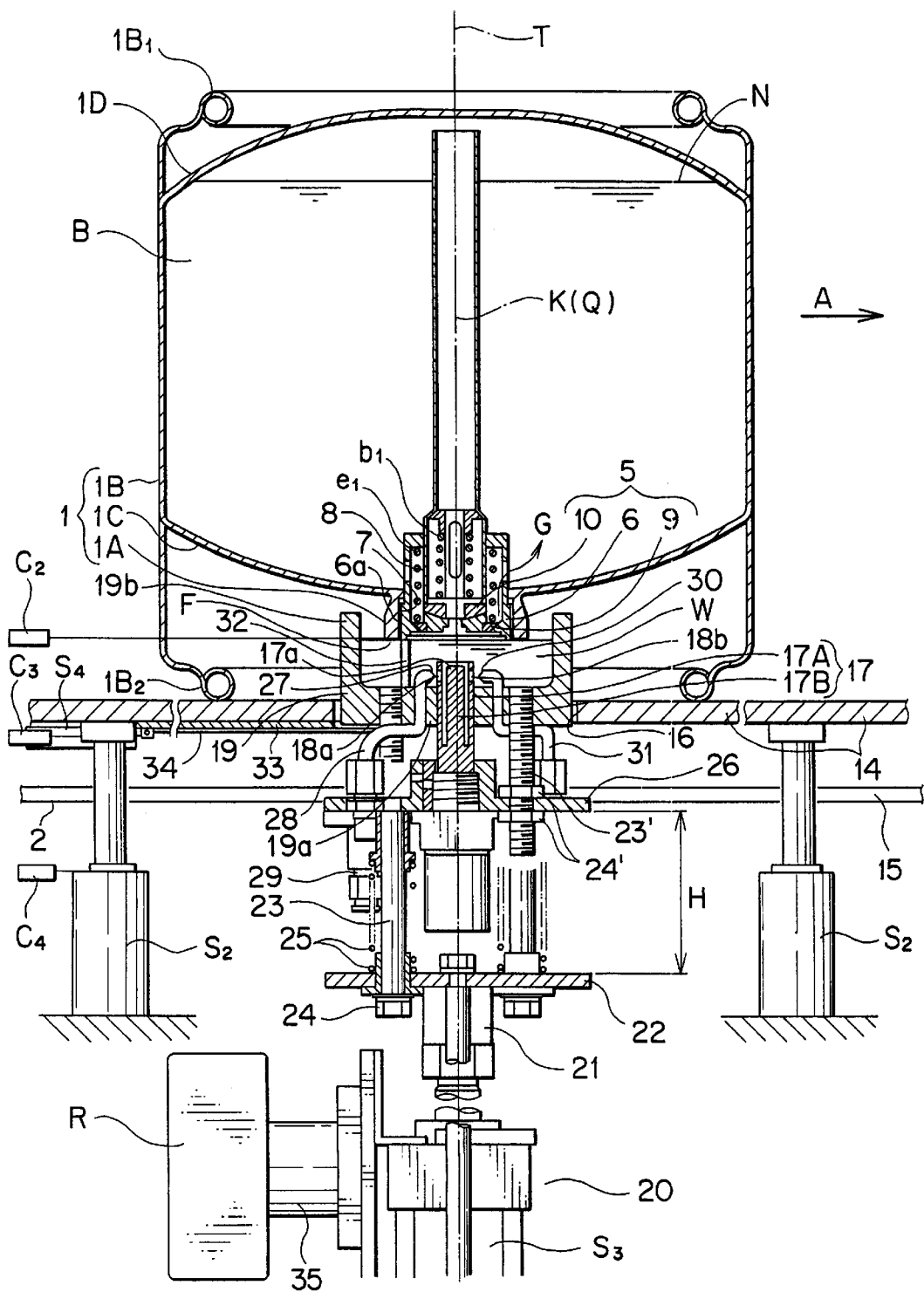
FIG. 1 is an enlarged section view showing a leakage check system of an enclosed liquid in a vessel according to an embodiment of the present invention.
Figure 2:
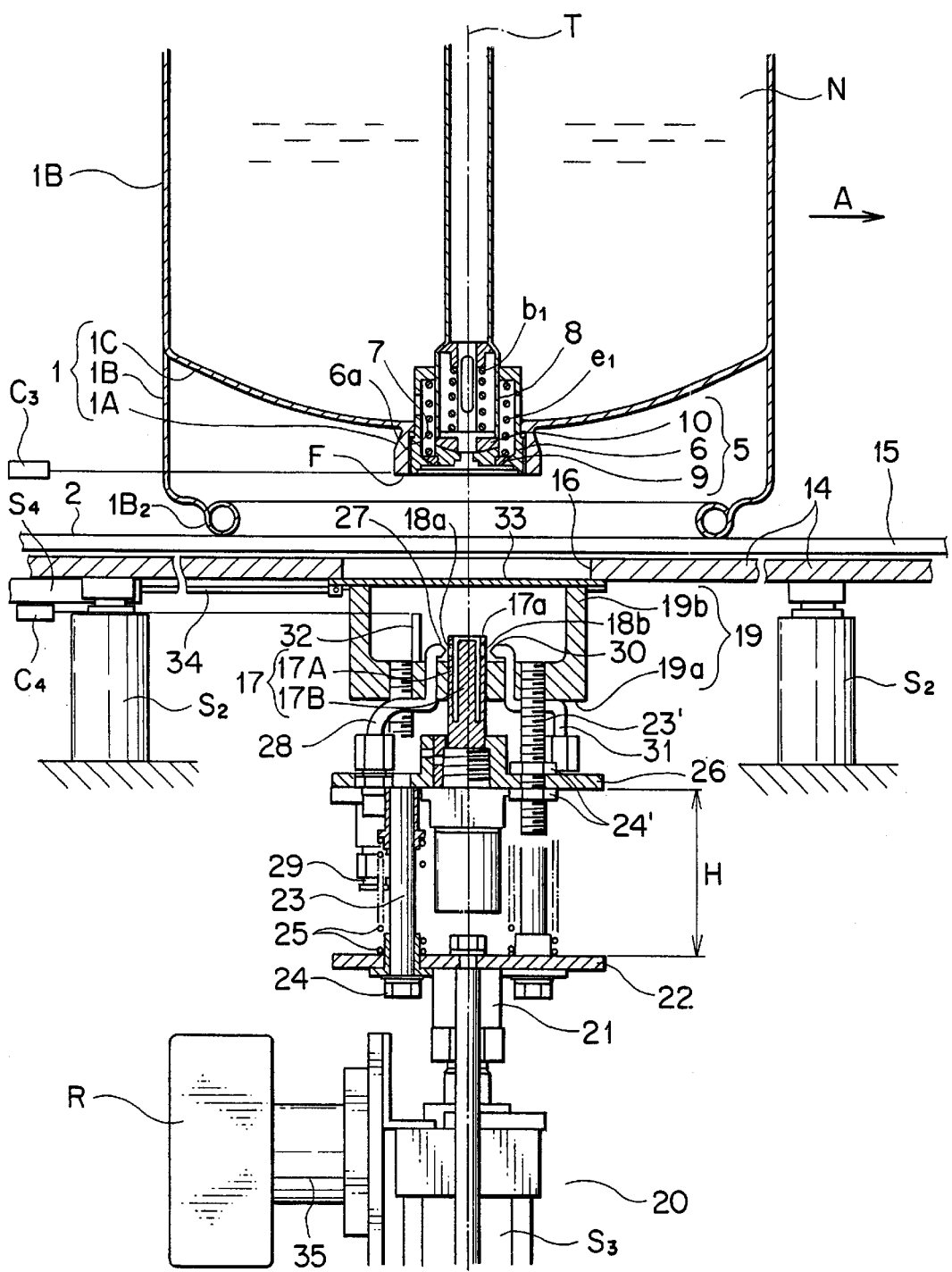
FIG. 2 is an enlarged section view showing the leakage check system, of which a sensing electrode is descended below a vessel at a leakage check location.
Figure 4:
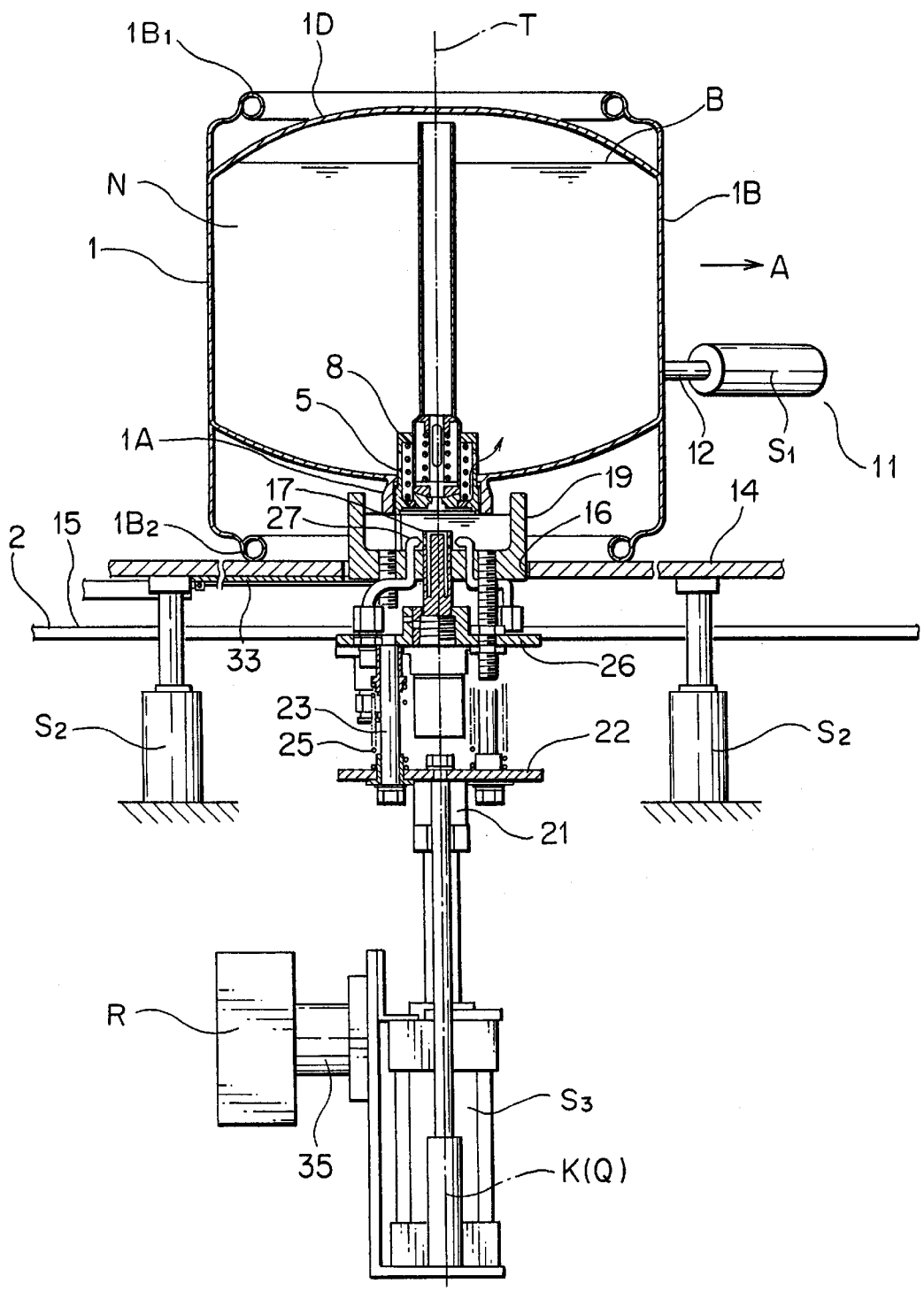
FIG. 4 is a section view showing generally the leakage check system at the leakage check location.

A vessel 1 including a sealed-in liquid N, like beer B, is conveyed by a conveyor 2 on a barrel carrying line 3. The vessel 1 that is made of an aluminum plate material or a steel plate material is a barrel as shown in FIGS. 1, 2, and 4. The vessel 1 has an outlet port 1A at the center of an upper lower face of the barrel and has a generally cylindrical peripheral wall 1B additionally extending upward and downward for defining a support structure for the barrel. The outlet port 1A is positioned within the extended peripheral wall 1B in the vertical direction.

Figure 5:
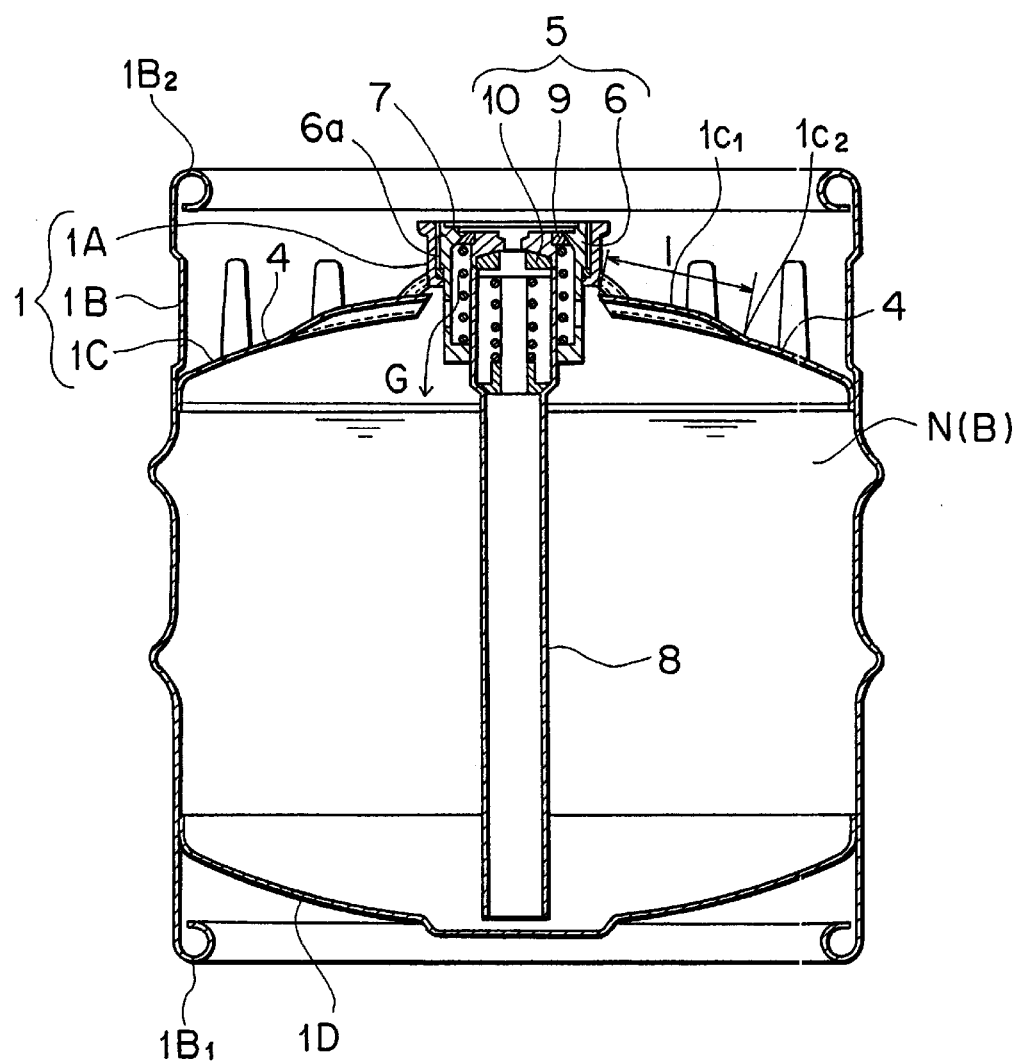
FIG. 5 is an enlarged section view showing another type of vessel associated with the embodiment.

The vessel 1 has a bottom wall 1C (see FIG. 1) that is provided with the outlet port 1A. The vessel 1 is in an upside-down position so that the outlet port 1A is directed downward when the vessel 1 is conveyed by the conveyor 2. The bottom wall 1C is a curved plate of a generally outwardly convex shape. The bottom wall 1C may be provided with a plurality of additional rib 1C1 (six in FIG. 6) as shown in FIGS. 5 and 6. The ribs extend radially from the outlet port 1A and protrude from the bottom wall 1C to prevent the bottom wall 1C from deforming or deflecting by an external force exerted on the vessel 1.

In FIGS. 5 and 6, the leading end 1C2 of the rib 1C1 is extending over a half of the bottom wall 1C. However, the extending length 1 of the ribs 1C1 may be changed in consideration of the strength and assembling of the vessel 1. Furthermore, the number of the ribs 1C1 may be changed according to the size of the vessel 1 or the capacity of the enclosed liquid N.

In FIG. 1, the extended peripheral wall 1B has an end ring 1B1, and has another end ring 1B2 provided in the opposite side of the end ring 1B1. The end rings 1B1, 1B2 have been defined respectively by curling an end portion of the extended peripheral wall 1B to strengthen the extended peripheral wall 1B. The end rings 1B1, 1B2 each have a flat supporting face to stably set the vessel 1 on the conveyor 2 with no gap therebetween. The vessel 1 has an end wall 1D that is a curved plate of a generally outwardly convex shape positioned lower than the end ring 1B1.

A sealing valve unit 5 is attached in the outlet port 1A of the vessel 1. The sealing valve unit 5 has, as shown in FIGS. 1, 2, and 4, a bush 6 that has an outer threaded surface 6a screwed into an inner threaded surface 7 of the outlet port 1A. The bush 6 includes a cylindrical member 8 pre-loaded by a first spring b1, and a gas sealing valve 9 defined at the periphery of the outer end of the cylindrical member 8 so as to be engageable with a valve seat that is attached on a lower inner surface of the bush 6. The bush 6 also includes a liquid valve 10 that is positioned inside the lower end of the cylindrical member 8 so as to be closed by a second pre-loaded spring e1. Opening the gas sealing valve 9 causes a pressurized gas G to be fed into the vessel 1, thereby opening the spring pre-loaded liquid valve 10 to deliver the enclosed liquid N to the outside of the vessel 1 through the cylindrical member 8.

Figure 3:
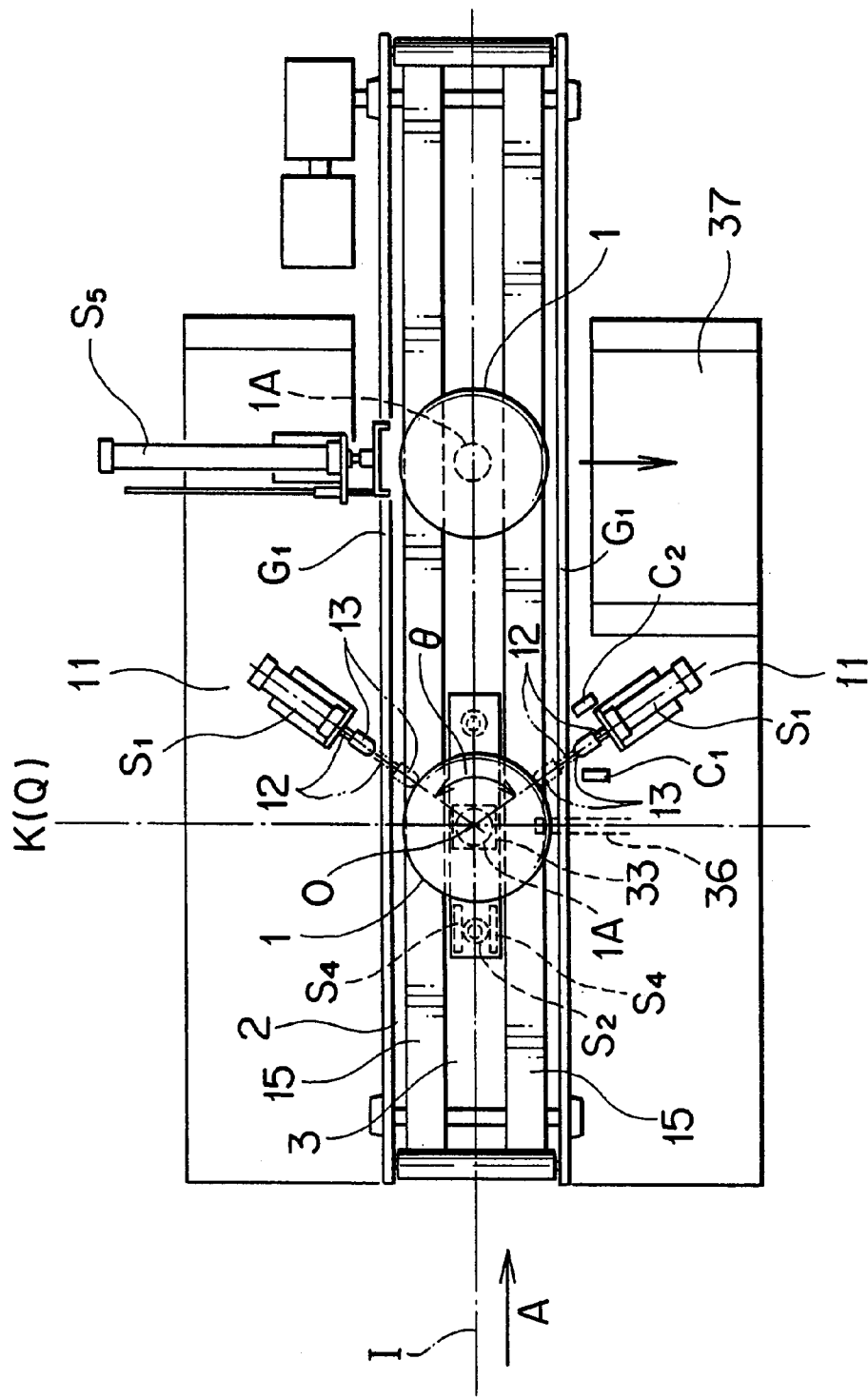
FIG. 3 is a plan view showing a barrel carrying conveyor line including the leakage check system of the embodiment.

As shown in FIG. 3, K a leakage check location for the enclosed liquid N is positioned in the vessel 1, which is provided beside the conveyor 2 of the barrel carrying line 3. There is provided a stopper 11 for stopping the upside-down vessels 1 conveyed by the conveyor 2 at the leakage check location K. The stopper 11 includes cylinders S1, S1 each having an extensible rod 12 that is directed toward the vertical center line O of the vessel 1. The cylinders S1, S1 are arranged to form a pre-determined angle θ therebetween.

A sensor C1 provided around the location K recognizes that a vessel 1 on the conveyor 2 has reached location K. Then, the cylinders S1, S1 act so that the rods 12, 12 extend toward the vertical center line O of the vessel 1. Thus, each leading end 13 of the rods 12, 12 abuts against an outer peripheral surface of the vessel 1 to stop the vessel 1 on the conveyor 2 for checking the leakage of the enclosed liquid N.

As shown in FIG. 1, there is provided a lift 14 that operates when a sensor C2 has recognized that the vessel 1 on the conveyor 2 has been stopped at the leakage check location K by the stopper 11. The lift 14 is moved by hydraulic cylinders S2, S2 provided across the location K to move the vessel 1 vertically to a traveling surface 15 of the conveyor 2.

The vessel 1 is moved upward by the lift 14 to leave apart it from the traveling surface 15 of the conveyor 2. At the same time, a sensor C3 recognizes the size of the vessel 1 for adjusting the stroke of the cylinder rod of the cylinder S2, thereby adjusting the lifted position of the vessel 1 according to the size of the vessel 1. An opening 16 is provided generally in the middle of the lift 14, through which an electrode 17 and a liquid receiving cup 19 that will be discussed later is movable toward the outlet port 1A of the vessel 1 in the axial direction T of the electrode 17.

The conveyor 2 consists of, for example, two lines of top-table-type endless chain conveyors disposed between opposed side frames. The two lines of chain conveyors have a clearance therebetween for passing the lift 14. Alternatively, the conveyor 2 may be a known type one, such as a roller conveyor or a belt conveyor (these are not illustrated).

An electrode 17 is provided for measuring the electrical conductivity of a liquid at the leakage check location K to known the leakage of the enclosed liquid N of the vessel 1 from the outlet port 1A. The electrode 17 is located below the transfer line of the conveyor 2 and is directed upward toward the vessel 1. The electrode 17 is moved by an actuator 20 (discussed later) toward the outlet port 1A of the vessel 1 in the axial direction T. The electrode 17 in mounted on a fitting plate 26 (discussed later).

Furthermore, the electrode 17 consists of an outer cylindrical wall 17A and an inner circular column 17B. The outer cylindrical wall 17A has a water inlet 18a at one side thereof and an air blow hole 18b at another side thereof. The circular column 17B is positioned inside of the outer cylindrical wall 17A. The leading end 17a of the electrode 17 can be moved into a liquid receiving cup 19 having a bottom 19a through which the electrode 17 extends so that the leading end 17a is surrounded by a side wall 19b of the liquid receiving cup 19 (see FIG. 1).

The outer peripheral surface of the electrode 17 is washed by injection of a water (pure water) ejected from a water feeder (discussed later). A part of the dilution liquid W forcefully enters inside the cylindrical wall 17A through the water inlet 18a. Thereby, the remaining test water in the cylindrical wall 17A is sufficiently cleaned together with contaminants, dust, etc. which have been included in the test water due to interfacial tension thereof. Thus, the electrode 17 is cleaned every time before correctly checking the leakage of the enclosed liquid N in the vessel 1 from the outer port 1A.

An actuator 20 is provided for moving the electrode 17 toward the outlet port 1A of the vessel 1 in the axial direction T. The actuator 20 consists of a cylinder S3, a mounting plate 22 connected to a cylinder rod 21 of the cylinder S3, fitting parts including a plurality of guide bolts 23 and nuts 24, and a fitting plate 26 that is resiliently supported by the mounting plate 22 with a distance H therebetween via springs 25, each provided around the guide bolt 23. By actuating the cylinder S3, the mounting plate 22 secured to the cylinder rod 21 moves the fitting plate 26 upward and downward via the springs 25 around the guide bolts 23.

For checking the position of the electrode 17 lifted by the rod 21 of the cylinder S3, the sensor C3 is positioned in height according to the size of the checked vessel 1. In addition, a sensor C4 is provided for detecting the electrode 17 which is at the descended position.

The liquid receiving cup 19 that is made of a synthetic resin or rubber has a bottom 19a and a generally cylindrical side wall 19b extending upward from the bottom 19a for surrounding the outlet port 1A. At the check location K of the conveyor line, the liquid receiving cup 19 is disposed upright under the outlet port 1A of the vessel 1 and is secured to the fitting plate 26 with a plurality of bolts 23' and nuts 24'. The bolts 23' are located not to abut against the bolts 23. The liquid receiving cup 19 has a diameter that is at least large enough to surround the outlet port 1A of the vessel 1. Even where the bottom wall 1C of the vessel 1, as shown in FIGS. 5 and 6, has the radially extending ribs 1C1, the liquid receiving cup 19 is defined so as to receive the outlet port 1A. The side wall 19b may have an inner diameter larger or smaller than that of the ribs 1C1. Thus, the liquid receiving cup 19 can surely catch the leakage of the enclosed liquid N. A predetermined quantity of the dilution water W is supplied into the liquid receiving cup 19 for correctly checking the leakage of the enclosed liquid N.

In FIGS. 1 and 2, a water supply nozzle 27 is provided to supply a predetermined quantity of a water W (pure water) into the liquid receiving cup 19 for checking the leakage of the enclosed liquid N in the vessel 1 at the leakage check location K. The water supply nozzle 27 is connected to a water feed pipe 28 upwardly passing through the fitting plate 26 and is arranged in the liquid receiving cup 19 through the bottom 19a such that the head of the nozzle 27 is directed to the water inlet 18a. Since the nozzle 27 can forcefully discharge a water, the inner and outer parts of the electrode 17 are cleaned before the next leakage check.

A feed water valve 29 is provided in the water feed pipe line 28 for adjusting the flow rate of the dilution water W.

An air blow nozzle 30 is provided for drying the electrode 17 that has already been cleaned by a jet of the dilution water W from the water supply nozzle 27. The air blow nozzle 30 is connected to an air feed pipe 31 and is aligned with an air blow hole 18b formed in the electrode 17. After the cleaning of the electrode 17, a dry air or a hot air is always blown out from the air blow nozzle 30 to dry the electrode 17.

A scale bar 32 is standing in the liquid receiving cup 19. The scale bar 32 has a length, of which the top abuts against a flat part of the outlet port 1A of the vessel 1 at the leakage check location K. This arrangement prevents the electrode 17 from conflicting with the outlet port 1A of the vessel 1 when the electrode 17 moves upward toward the outlet port 1A through the opening 16 of the lift 14. This configuration can also prevent that the outlet port 1A from being deformed and the sealing valve unit 5 or the electrode 17 itself suffers from suffering damage or an undesirable deformation.

In FIGS. 2 and 3, a cover 33 is located between the vessel 1 and the electrode 17 at the leakage check location K. The cover 33 moves in a generally horizontal direction under the conveyor 2. The cover 33 that can slide along left and right side frames 34, 34 is moved by the cylinder rod of a cylinder S4 that may be attached to the lift 14. The cover 33 closes the liquid receiving cup 19 to protect the electrode 17 that has been cleaned by the dilution liquid W after the leakage check of the enclosed liquid N, preventing dust and a leaked liquid N from entering into the liquid receiving cup 19 to be ready for the next leakage check.

A rotary actuator R has a rotation axis 35 normal to the vertical center line of the cylinder S3. The pivoting of the rotary actuator R by about 90° causes the dilution liquid W that has been used for the leakage check to come out from the liquid receiving cup 19.

An air blow nozzle 36 (see FIG. 3) is pivoted by the rotary actuator R. The air blow nozzle 36 blows out a hot air or a dry air toward the liquid receiving cup 19 and the electrode 17 to dry them after the dilution liquid W is discharged.

An additional conveyor 37 is disposed beside the conveyor 2 downstream from the leakage check location K for excluding the vessel 1 of which the leakage of the enclosed liquid N has been recognized. A hydraulic cylinder S5 is utilized to move the vessel on the additional conveyor 37.

Regarding the embodiment of the present invention, which is configured as described above, a leakage check process of the enclosed liquid N sealed in the vessel 1 will be discussed hereinafter.

First, in a beer production line, for example, in a barrel carrying line 3, the vessel 1 having a sealed-in liquid N that is beer B is moved by the conveyor 2 in a direction shown by an arrow A with the vessel 1 being upside down so that the outlet port 1A is directed downward. During the transportation of the vessel 1, even the upside-down vessel 1 is transferred surely and smoothly since the peripheral wall 1B of the vessel 1 has the upper end ring 1B1 and the lower end ring 1B2 that each have a flat contact end. The outlet port 1A of the vessel 1 has been cleaned in advance to remove contaminants by an additional water feeder.

To check whether the enclosed liquid N sealed in the vessel 1 is leaking from the outer port 1A, first, the sensor C1 senses that the vessel 1 that has been conveyed by the conveyor 2 has reached the leakage location F. Then, the stopper 11 consisting of the cylinders S1, S1 located in the left and right sides of the conveyor 2 acts to extend the cylinder rods 12, 12. The abutment ends 13, 13 of the cylinder rods 12, 12 are advanced toward the vertical center line O of the vessel 1 each to abut against an outer surface of the vessel 1 so that the vessel 1 stops on the conveyor 2. Thus, the vessel 1 is correctly positioned for the leakage check of the enclosed liquid N.

When the abutment ends 13, 13 of the cylinder rods 12, 12 contact the vessel 1, the conveyor 2 may be stopped at the same time. However, the conveyor 2 may run continuously for effectively transferring the vessel 1 in consideration of the leakage check time of the enclosed liquid N and the interval of the transferred vessels 1. The adjustable extension of the cylinder rods 12, 12 according to the size of the vessel 1 allows the vertical center line O of the vessel 1 on the conveyor 2 to align with the center line of the electrode 17.

Where a roller conveyor is applied for the conveyor 2, the roller conveyor may advantageously have rollers that each are rotated by frictional engagement between the roller and its rotation shaft. The rotation shaft can rotate slidingly against the roller when the driving force of the rotation axis is greater than the frictional engagement force. Such roller conveyors can continue operation even when the vessel 1 has been stopped by the stopper 11 at the leakage check location K.

Next, the sensor C1 detects that the stopper 11 has stopped the vessel 1 on the conveyor 2 at the leakage check location K. Then, the cylinders S2, S2 extend the cylinder rod to move upward the lift 14 above the traveling surface 15 of the conveyor 2 (see FIGS. 1 and 4). Thus, the vessel 1 receives no force from the traveling surface 15 of the conveyor 2 after being lifted.

After the sensor C2 has detected that the vessel 1 is lifted above the traveling surface 15 of the conveyor 2, the cylinder S4 secured to the lift 14 extends the cylinder rod and the cover 33 attached to the leading end of the cylinder rod moves in a generally horizontal direction to open the opening 16. Then, the cylinder S3 extends the cylinder rod 21 so that the mounting plate 22 connected to the cylinder rod 21 moves upward. Thus, the electrode 17 protruding in the liquid receiving cup 19 attached to the fitting plate 26 that is moved according to the movement of the mounting plate 22 via the springs 25 moves upward toward the outlet port 1A of the vessel 1 through the opening 16.

Next, when the sensor C3 has detected that the scale bar 32 has contacted the flat surface F of the outlet port 1A, the cylinder S3 stops so that the liquid receiving cup 19 and the electrode 17 therein do not ascend further, preventing the leading end 17a of the electrode 17 from abutting against the outlet port 1A. Thus, the outlet port 1A, the sealing valve unit 5, and the electrode 17 do not suffer a deformation or damage due to such abutment (see FIG. 1).

After the sensor C3 has detected that cylinder S3 has stopped, the feed water valve 29 opens to supply upward a predetermined quantity of dilution water W via the water supply nozzle 27 into the liquid receiving cup 19. Though the outlet port 1A of the vessel 1 shown in FIGS. 7 and 8 has the generally flat surface F, which does not have a well, the liquid receiving cup 19 positioned below the outlet port 1A of the upside-down vessel 1 can receive the dilution water W. After the liquid receiving cup 19 has received a predetermined quantity of dilution water W, the feed water valve 29 is closed to stop the water supply into the liquid receiving cup 19.

Next, by measuring the electrical conductivity of the dilution water W in the liquid receiving cup 19, it is checked that the enclosed liquid N, which is beer B, in the vessel 1 has leaked from the outlet port 1A.

Figure 7:
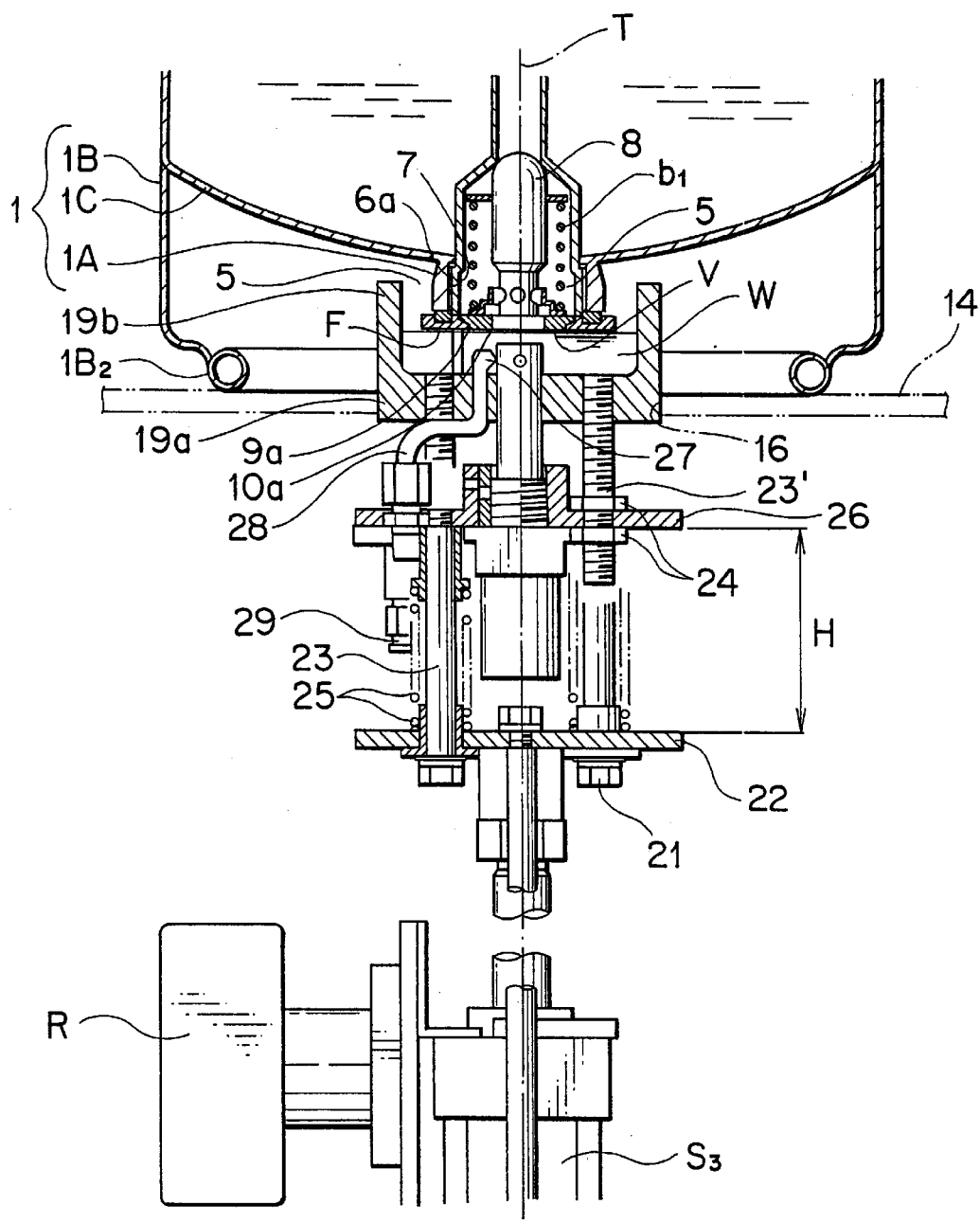
FIG. 7 is an enlarged section view showing a leakage check state for a barrel-shaped vessel having an outlet port that consists of a single-valve-type sealing valve unit.
Figure 8:
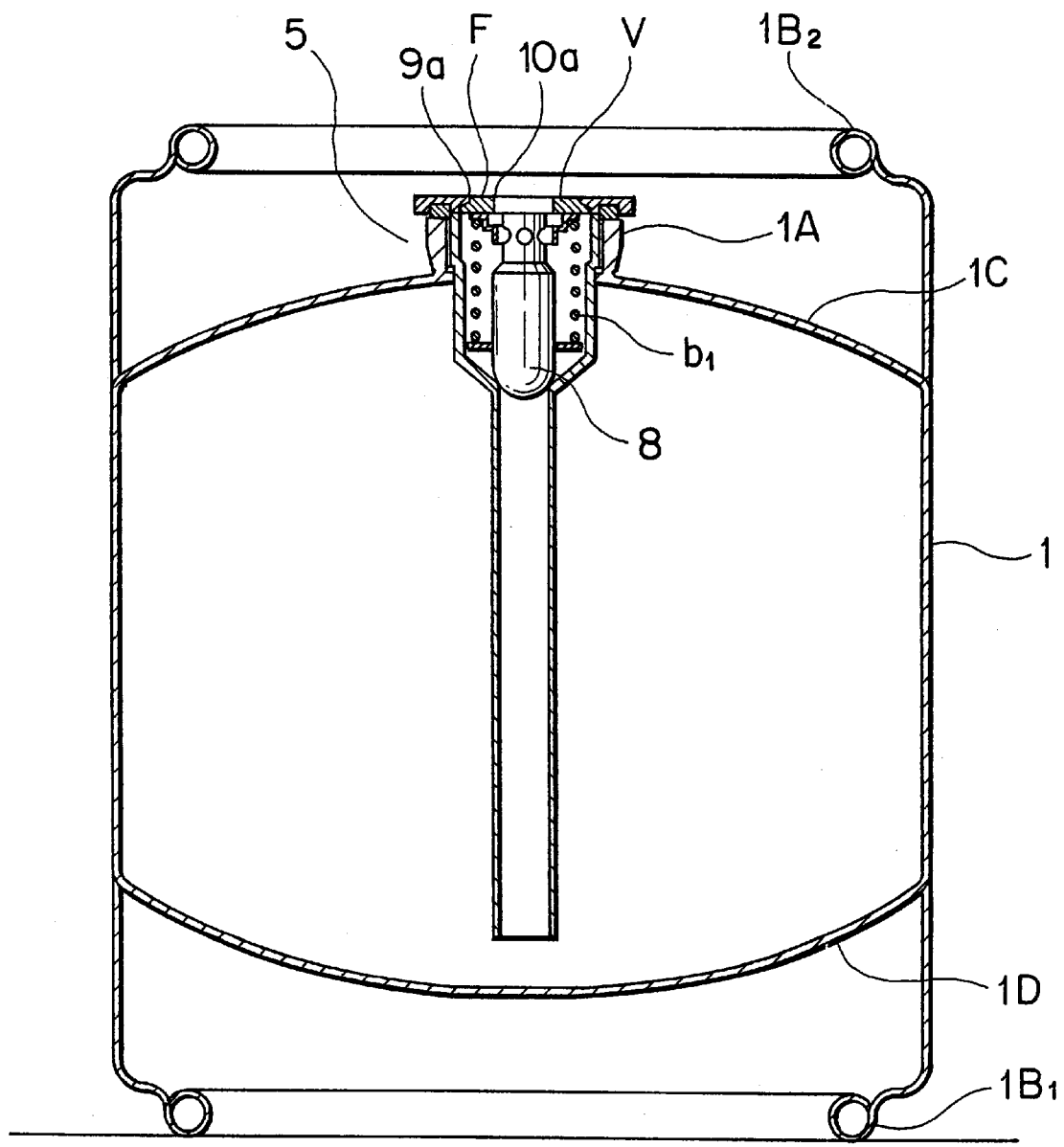
FIG. 8 is an enlarged section view showing the vessel of FIG. 6, in which the vessel is in an upright position.
Figure 9:
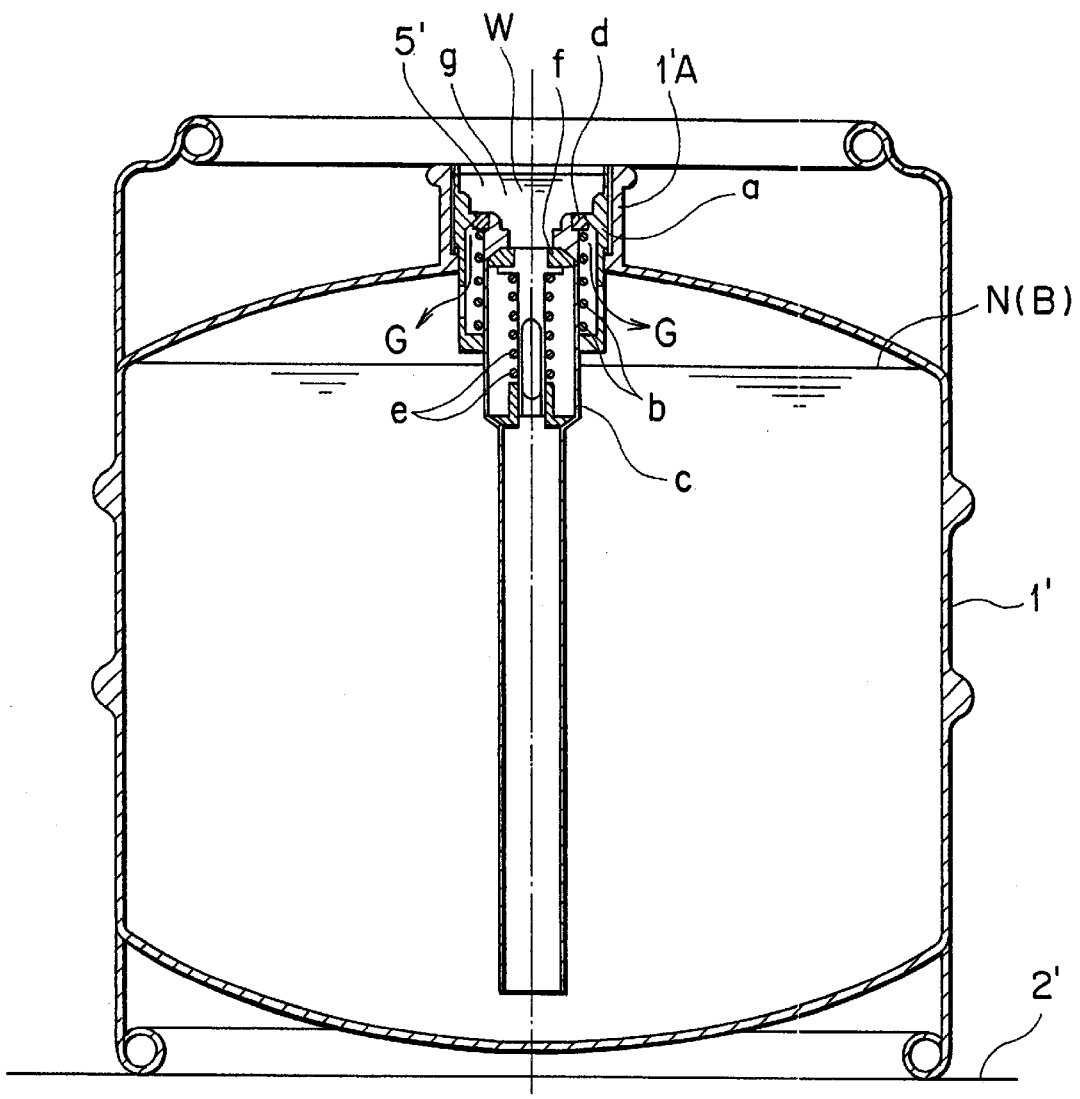
FIG. 9 is an enlarged section view showing a known barrel-shaped vessel that has an outlet port provided with a sealing valve unit.
Figure 10:
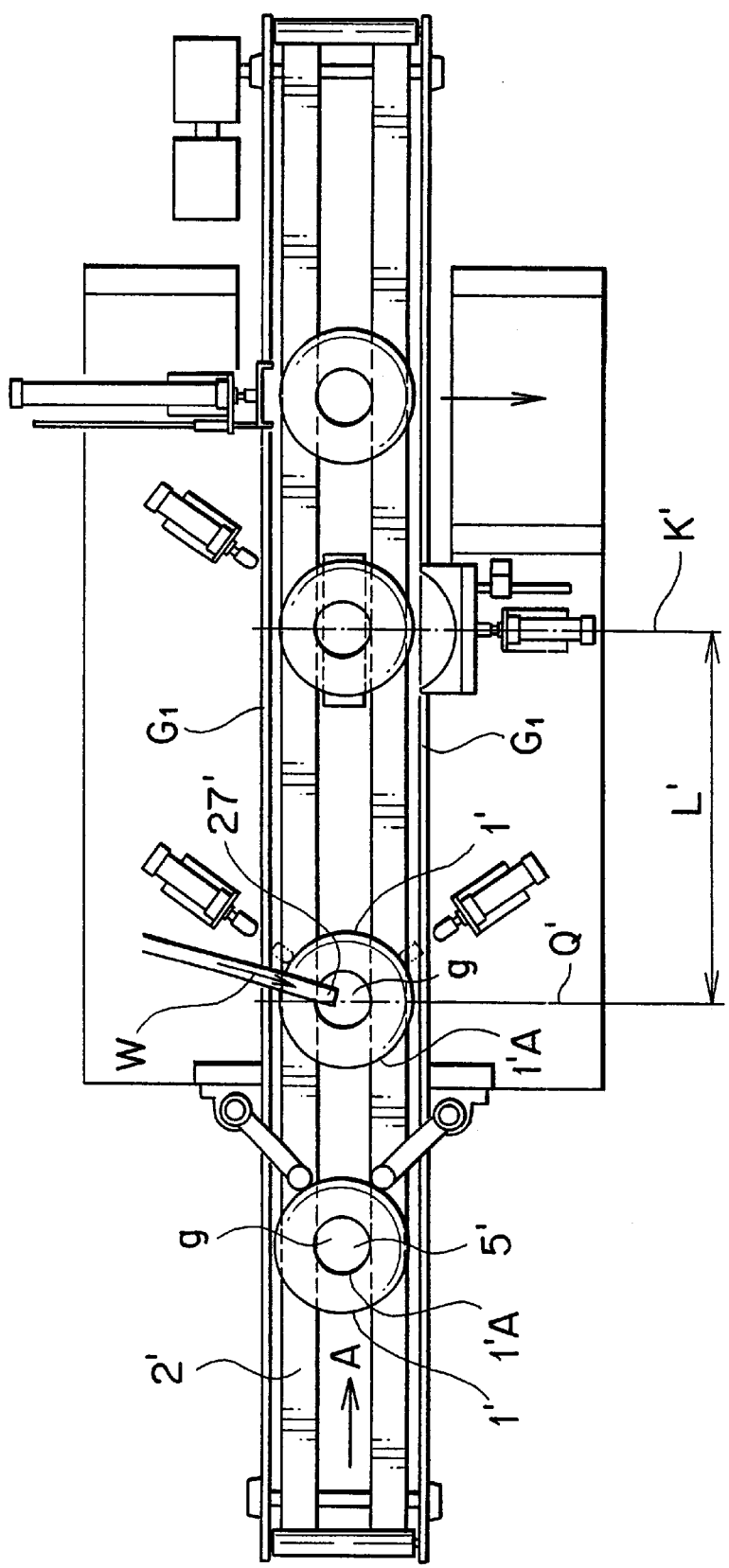
FIG. 10 is a plan view showing a known leakage check system arranged in a barrel carrying conveyor line for checking barrels.
Figure 11:
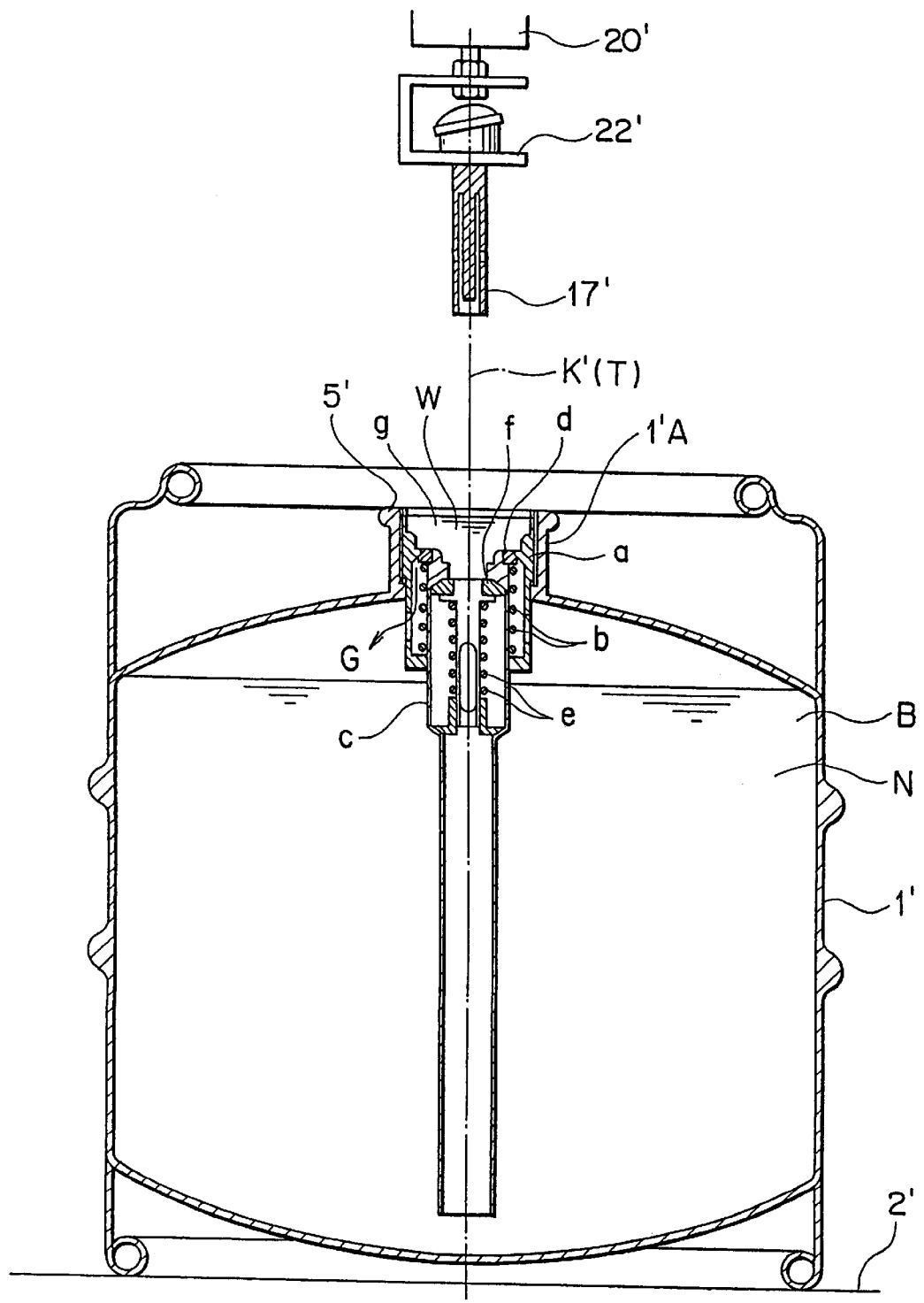
FIG. 11 is an enlarged a section view showing the barrel of FIG. 10.
Figure 12:
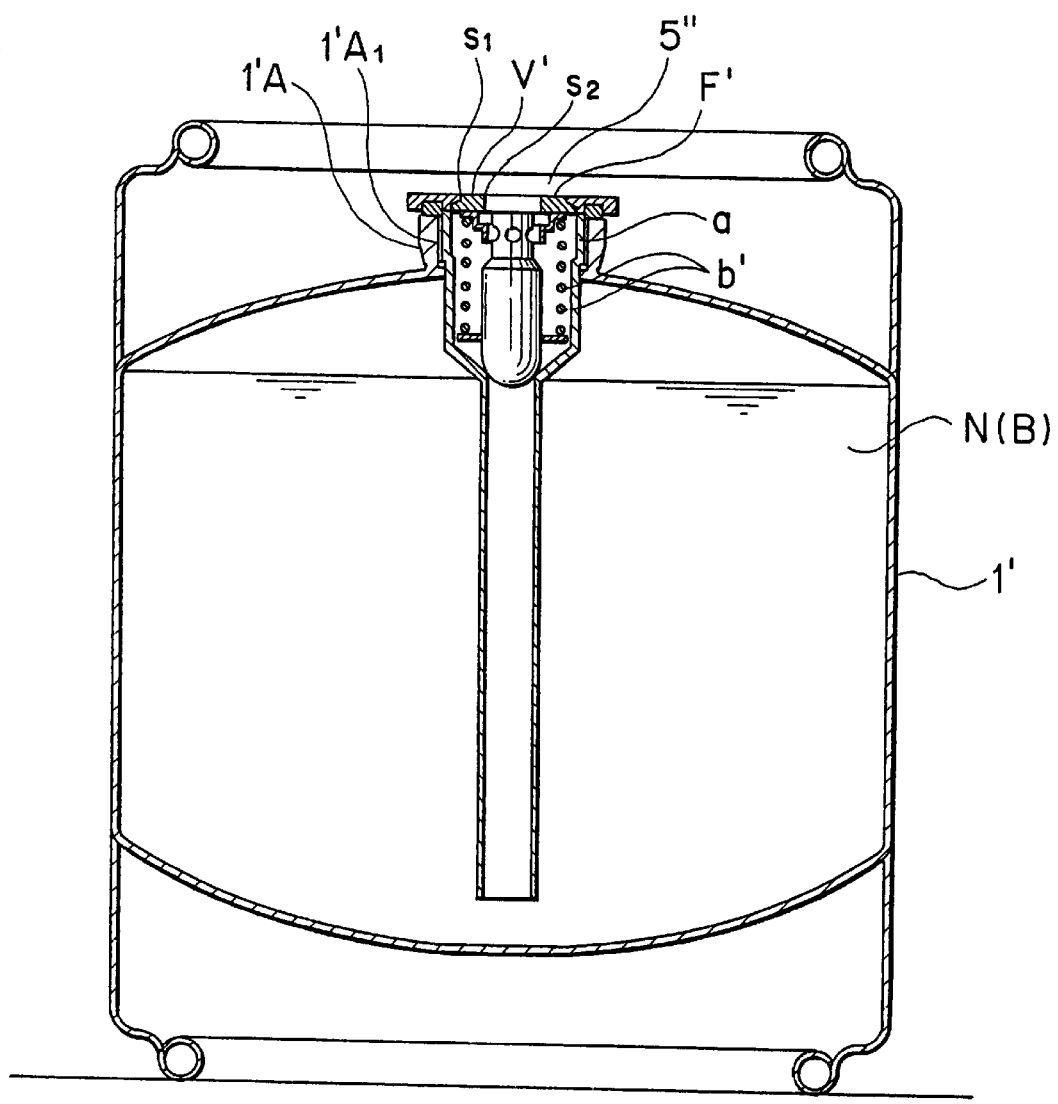
FIG. 12 is an enlarged section view showing another known barrel-shaped vessel that has an outlet port provided with a single-valve-type sealing valve unit with a flat top surface.

Since the inner side surface of the liquid receiving cup 19 is larger than the outlet port 1A of the vessel 1 in diameter, in respect of the outlet port 1A of the vessel 1 shown in FIGS. 1 and 2, which has the sealing valve unit 5 including the gas sealing valve 9 and the liquid valve 10, the leakage of the enclosed liquid N can be found between the gas sealing valve 9 and the associated valve seat, between the liquid valve 10 and the related valve seat, and between the threaded surface 7 formed in the inner surface of the outlet port 1A and the threaded surface 6a of the outer surface of the sealing valve unit 5. Similarly, where the outlet port 1A of the vessel 1 has the sealing valve unit 5 having the single valve means V as shown in FIGS. 7 and 8, the leakage of the enclosed liquid N between the threaded surface 7 formed in the inner surface of the outlet port 1A and the threaded surface 6a formed in the outer surface of the sealing valve unit 5 can be checked in addition to the leakage from the gas passage 9a or the liquid passage 10a.

After the measurement of the electrical conductivity of the dilution water W, the cylinder S3 acts to move back the cylinder rod 21 so that the mounting plate 22 secured to the cylinder rod 21 moves downward. The liquid receiving cup 19 with the electrode 17 also moves downward through the opening 16 of the lift 14 since the cup 19 is secured to the fitting plate 26 that moves according to the movement of the mounting plate 22 with the distance H therebetween. Then, when the sensor C4 has detected that the electrode 17 has returned to its original position, the rotary actuator R operates to pivot the liquid receiving cup 19 with the electrode 17 by 90° around the rotation axis 35 to discharge the checked dilution water W from the liquid receiving cup 19. Next, the feed water valve 29 opens so that the water supply nozzle 27 ejects water toward the electrode 17 to clean it, removing the leaked liquid N and contaminants, like dust. The water supplied from the water supply nozzle 27 cleans not only the outer surface of the cylindrical wall 17A of the electrode 17 but also the inner surface of the cylindrical wall 17A and the circular column 17B located inside of the outer cylindrical wall 17A through the water inlet 18a.

After the cleaning, the air blow nozzles 30, 36 blow a hot air or a dry air toward the electrode 17 to dry it.

After the drying is finished, the rotary actuator R pivots reversely so that the liquid receiving cup 19 with the electrode 17 returns to align with the vertical center line of the cylinder S3.

Next, the cylinder S4 extends the cylinder rod to move the cover 33 in the generally horizontal direction so as to close the opening 16 that is above the electrode 17. Thus, contaminants like dust may not stick on the electrode 17, preparing for a next correct leakage check of the enclosed liquid N.

Then, the stopper 11 including the cylinders S1, S1 operates to move back the cylinder rods 12, 12 so that the conveyor 2 can transfer the vessel 1 that has finished the leakage check. In addition, the unacceptable vessel 1, of which the leakage of the enclosed liquid N from the outlet port 1A has been determined, is moved to the rejection conveyor 37 by the extension of the cylinder rod of the cylinder S5.

As described above, in the embodiment, the upside-down vessel 1 having the enclosed liquid N is transferred on the conveyor 2. The embodiment includes integrally the electrode 17 for checking the leakage of the enclosed liquid N at the leakage check location K, the liquid receiving cup 19 surrounding the electrode 17, the water feeder, the air blow nozzles 30, 36 for the drying, etc. normally under the conveyor 2. Generally, only the stopper 11 is arranged above the conveyor 2, which provides a sufficient work area for personnel to check the leakage around the conveyor 2.

Moreover, the vessel 1 having the enclosed liquid N in the upside-down state where the outlet port 1A is directed downward is conveyed by the conveyor 2. Furthermore, the outlet port 1A of the vessel 1 is opposed to the liquid receiving cup 19 with the dilution water W at the leakage check location K. Consequently, since the leakage check location K and the water supply location Q are positioned in the same place, the vessel 1 is not required to move between the two locations K and Q. This configuration eliminates the disadvantages described in the prior art that the transfer operation of the vessel 1 between the two locations K and Q gives the vessel 1 a vibration force or an impactive force from the moving conveyor 2 so that the dilution water W contained in the outlet port 1A possibly flows out to the outside to lose partially the predetermined quantity of the dilution water W for the leakage check. Furthermore, the liquid receiving cup 19 is covered by the cover 33 after being cleaned, preventing contaminants like dust from sticking on the electrode 17 in the liquid receiving cup 19. This arrangement allows a correct leakage check of the enclosed liquid N and reduces time and work required for the leakage check.

In the above-described embodiment, the cylinder S3 moves the electrode 17 upward toward the outlet port 1A of the vessel 1 that is conveyed by the conveyor 2 for checking the leakage of the enclosed liquid N from the outlet port 1A. Alternatively, the vessel 1 may be moved downward toward the electrode 17 for checking the leakage of the enclosed liquid.

Furthermore, in the embodiment, only one leakage check system including the electrode 17 is provided at the leakage check location K in the barrel carrying line 3. However, a plurality of leakage check systems each including the electrode 17 may be arranged in the barrel carrying line 3 for checking a plurality of vessels 1 at the same time to provide a more efficient leakage check system.

As described above, the invention provides the leakage check system for efficiently checking the leakage from the outlet port of the upside-down vessel conveyed by the conveyor, in which no well is defined in the outlet port of the vessel because of the liquid receiving cup provided in the leakage check system. The liquid receiving cup can receive a predetermined quantity of water so that the system can correctly check the leakage of the enclosed liquid even where the outlet port has a flat face.

What is claimed is:

1. A leakage check system for a liquid enclosed in a vessel that has an outlet port having a sealing valve unit that can close a gas passage and a liquid passage, said leakage check system comprising:
    an electrode configured to measure liquid electrical conductivity to determine leakage of the enclosed liquid from said outlet port,
    an actuator configured to move said electrode forward and backward relative to said outlet port in a longitudinal direction of said electrode,
    a liquid receiving cup surrounding a forward part of said electrode, said forward part of the electrode extending from a bottom of said liquid receiving cup, and
    a water feeder configured to supply a dilution water into said liquid receiving cup,
    wherein said vessel can be conveyed by a conveyor with said vessel being upside down so that said outlet port is directed downwardly, said outlet port of said vessel being insertable into said liquid receiving cup.

2. The leakage check system as recited in claim 1, wherein said sealing valve unit includes:
    a bush screwed in an inner threaded surface of said outlet port of said vessel,
    a cylindrical member inserted into said bush and pre-loaded by a first spring,
    a gas sealing valve engageable with an end surface of said bush and extending outwardly from a peripheral face of said cylindrical member, and
    a liquid valve closed by a pre-loaded second spring and positioned in an upper part of said cylindrical member for flowing out the enclosed liquid from said vessel through said cylindrical member by opening said gas sealing valve to feed a pressurized gas into said vessel.

3. The leakage check system as recited in claim 1, wherein said sealing valve unit has a generally flat outer face and comprises:
    a bush screwed in an inner threaded surface of said outlet port of said vessel, and
    a valve pre-loaded by a spring and positioned in said bush for closing the liquid passage and the gas passage that is positioned outside of the liquid passage.

4. The leakage check system as recited in claim 1, wherein said vessel that is conveyed by the conveyor in an upside-down position can be moved on and removed from the conveyor by a lift provided near the conveyor at a leakage check location for said vessel, and said liquid receiving cup having a leading end of said electrode can move through an opening provided in the lift toward said outlet port of said vessel in a longitudinal direction of said electrode.

5. The leakage check system as recited in claim 1, wherein said vessel has a pair of generally cylindrical peripheral walls one of which is extending upwardly and the other downwardly from said vessel, and extending peripheral wall each having an upper end ring or a lower end ring, said outlet port being located within one of said extending peripheral walls.

6. The leakage check system as recited in claim 1, wherein said vessel has an outwardly generally convex curved end wall and a generally cylindrical peripheral rising wall, said outlet port being located in the center of said end wall.

7. The leakage check system as recited in claim 1, wherein said vessel has an end wall and said outlet port is located in the center of said end wall, said end wall having a plurality of ribs radially extending from said outlet port.

8. The leakage check system as recited in claim 1, wherein said liquid receiving cup has a generally cylindrical side wall that can encircle said outlet port of said vessel with a space therebetween.

9. The leakage dock system as recited in claim 7, wherein said liquid receiving cup has a diameter that intersects with said radially extending ribs.

10. The leakage check system as recited in claim 7, wherein said liquid receiving cup has a diameter that can encircle said radially extending ribs.

11. The leakage check system as recited in claim 1, wherein said system has an openable cover provided at a leakage check location, said cover being generally horizontally moved between said vessel and said liquid receiving cup so that said cover can close to protect said electrode after a leakage check of the enclosed liquid.

12. The leakage check system as recited in claim 1, further comprising a rotary actuator configured to pivot vertically said liquid receiving cup to discharge the dilution water in said liquid receiving cup after every leakage check of the enclosed liquid.

13. The leakage check system as recited in claim 1, further comprising at least one water jet nozzle configured to clean said liquid receiving cup and said electrode.

14. The leakage check system as recited in claim 1, further comprising an air supplier having an air blow nozzle configured to feed a hot air or a dry air to dry said liquid receiving cup and said electrode after the dilution water in said liquid receiving cup is discharged.

* * * * *